United States Patent
Baumeister

(10) Patent No.: US 6,623,581 B2
(45) Date of Patent: *Sep. 23, 2003

(54) METHOD FOR REGENERATING BRAKE LININGS

(75) Inventor: Bernhard Baumeister, Lage (DE)

(73) Assignee: Rütgers Automotive Aktiengesellschaft, Essen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 2 days.

(21) Appl. No.: 09/308,370

(22) PCT Filed: Dec. 1, 1997

(86) PCT No.: PCT/EP97/06731

§ 371 (c)(1),
(2), (4) Date: May 14, 1999

(87) PCT Pub. No.: WO98/25047

PCT Pub. Date: Jun. 11, 1998

(65) Prior Publication Data

US 2002/0104604 A1 Aug. 8, 2002

(30) Foreign Application Priority Data

Dec. 3, 1996 (DE) .......................... 196 50 026

(51) Int. Cl.⁷ ............................................. B32B 35/00
(52) U.S. Cl. ........................ 156/94; 156/94; 156/98; 156/153
(58) Field of Search ............................ 156/94, 98, 153; 428/564; 29/402.01, 402.06, 402.08, 402.11; 188/251 R, 253; 192/107 T, 108

(56) References Cited

U.S. PATENT DOCUMENTS 5,601,174 A * 2/1997 Schulz ...................... 192/107

FOREIGN PATENT DOCUMENTS

| DE | 4334207 | * | 12/1994 |
| DE | 4334207 C1 | * | 12/1994 |
| GB | 2245667 | * | 1/1992 |
| GB | 2299382 | * | 10/1996 |
| JP | 01055441 A | * | 3/1989 |
| WO | 98/27358 | * | 6/1998 |

* cited by examiner

Primary Examiner—Michael W. Ball
Assistant Examiner—Gladys Corcoran
(74) Attorney, Agent, or Firm—Blakely, Sokoloff, Taylor & Zafman

(57) ABSTRACT

In order to regenerate a brake lining, preferably for a railway vehicle, a friction lining is worked by machining, starting from its worn surface, and provided with a three-dimensional surface profile. The profiled surface is then coated with an agglutinant, and a fresh friction lining substance is pressed on. The worn surface is preferably worked by profile grinding or profile milling, such that a profiled surface structure is produced having a teeth-like, trapezoidal or meander-shaped profile that is vertical to the surface, wherein the profile depth of the surface structure lies in the region of approx. 1–30 mm, preferably 5–20 mm. The profile is preferably oriented in one direction, crosswise to the main strain of the friction lining during braking.

17 Claims, 2 Drawing Sheets

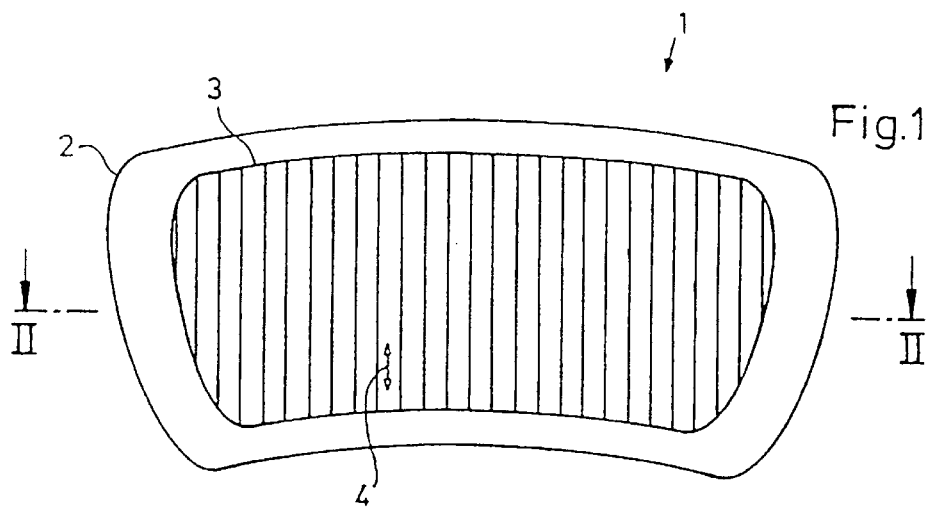
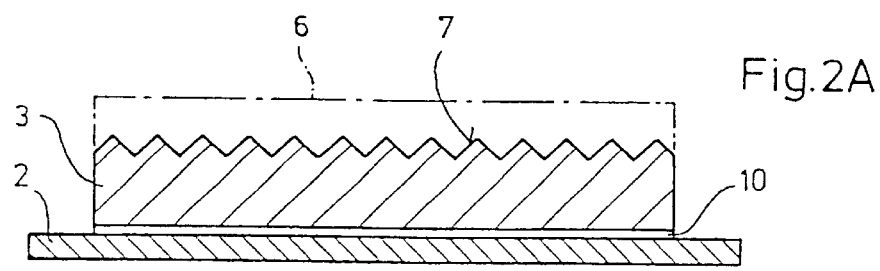
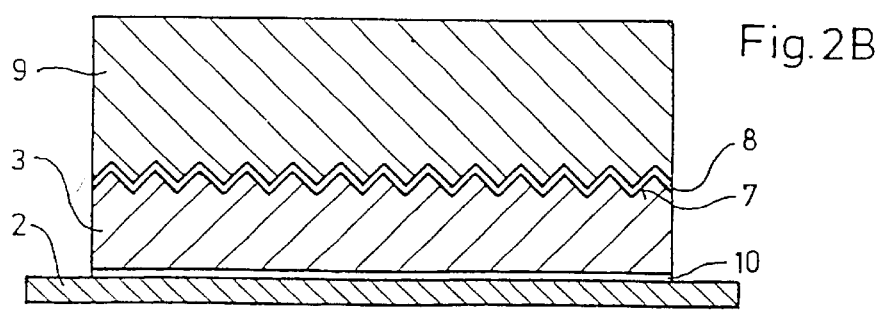

METHOD FOR REGENERATING BRAKE LININGS

BACKGROUND OF THE INVENTION

1. Field of the Invention

The invention relates to a method of regenerating brake linings, particularly for railway vehicles.

2. Description of the Related Art

Brake linings have a friction lining attached to a lining carrier. The friction lining layer is worn away during the braking process as a result of the frictional loading so that replacement of the used brake lining becomes necessary. Brake linings are commonly replaced before the friction lining layer has been completely removed at the most strongly worn position. For reasons of safety brake linings are generally replaced considerably before they are fully worn. For instance, linings on railway vehicles are commonly replaced when their friction lining layer has been about 50% used up.

Although a large proportion of the friction lining layer thus remains unused, the used brake linings are subjected to material recycling.

BRIEF SUMMARY OF THE INVENTION

It is the object of the invention to provide a method of regenerating brake linings, particularly for railway vehicles, that permits more economical recycling of the used brake linings.

This object is solved in accordance with the invention by a method for regenerating brake linings, particularly for railway vehicles, in which a friction lining layer is machined from its worn surface and provided with a three-dimensional surface profile, the profiled surface is coated with a bonding agent and thereafter a fresh friction lining composition is pressed on.

This method has the advantage by comparison with the known methods that a substantially greater proportion of the remainder of the friction lining, which has not been worn away, can be reused for the regenerated brake lining. Any oblique wear which potentially occurs, i.e. non-uniform abrasion of the old friction lining layer, is fully compensated for by the regenerating method in accordance with the invention. Furthermore, the dust or chippings produced by grinding away or milling away the surface of the friction lining can be reused, for instance for road building purposes.

The three-dimensional surface profile creates a toothed transition between the old friction lining composition and the newly pressed on composition. The lining thus formed can be worn away over the newly applied layer of friction lining composition, whereby use of the entire new lining thickness is rendered possible. At no stage of the abrasion is a surface layer of which a major proportion comprises bonding agent used for braking purposes.

In one embodiment of the method in accordance with the invention the worn surface is machined by profile grinding or profile milling such that a profiled surface with a tooth-shaped, trapezoidal or meander-shaped profile perpendicular to the surface is produced, the profile extending, at least in sections, in a first direction on the surface. In another embodiment the worn surface is machined by coarse grinding such that an irregular surface structure with substantially elongate recesses is produced, the recesses which are formed extending, at least in sections, substantially in a first direction. This machining process is performed successively in two intersecting directions in a further embodiment. In the embodiments of the method in accordance with the invention referred to above a surface structure is produced which affords a large area and into which the fresh friction lining, which is subsequently pressed on, engages, so that shearing away of the fresh lining is prevented. The selection between the aforementioned surface structures or profiles is effected in dependence on the machining process selected, particularly the tools which are used and the desired field of application of the regenerated brake linings.

An advantageous embodiment of the invention is characterised in that the profile depth of the surface structure is in the region of about 1 to 30 mm, preferably 5 to 20 mm. The profile depth of the surface structure is so selected that there is a minimal risk of shearing away and a good connection between the old friction lining and the newly applied friction lining composition. On the other hand, the profile depth is so selected that as large a proportion as possible of the old friction lining composition can be reused, i.e. that as small a proportion as possible is removed by the grinding process.

If the new friction lining layer is worn down beyond the transition between the new and old friction lining compositions, the depth of the profile results in the surface of the friction lining never having a large proportion of bonding agent.

In a preferred embodiment of the method in accordance with the invention a direction transverse, preferably at right angles, to the direction of the main loading of the friction lining during the braking process is selected as the first direction. The risk of the newly applied friction lining composition shearing away from the old friction lining composition is thereby further reduced.

In one embodiment of the method the first direction is altered in a plurality of adjoining sections of the friction lining surface. This feature further improves both the adhesion and also the shear resistance of the applied friction lining composition.

One embodiment of the invention is characterised in that a worn friction lining layer applied to a metal plate is worn down to a predetermined residual thickness such that the plate constitutes, together with the remaining friction lining layer, a sufficiently mechanically stable structure for the further method steps. This exemplary embodiment finds application particularly in linings for railway vehicles or other large linings with relatively thin carrier plates. The thin plate together with a sufficiently thick residual lining serve as a carrier for the regenerated brake lining. Particularly in the case of those brake linings in which the lining carrier is a thin plate and in which the friction lining composition thus serves additionally to mechanically stabilise the structure, the brake linings are replaced at a relatively early time at which the remaining frictional lining is still sufficiently thick to stabilise the structure. In this application about 30 to 60% of the friction lining composition is saved by the method in accordance with the invention.

A substance containing phenol resin or rubber is preferably used as the bonding agent in the method in accordance with the invention.

Further advantageous embodiments of the invention are characterised in the dependent claims.

BRIEF DESCRIPTION OF THE DRAWINGS

The invention will be described below in more detail by way of exemplary embodiments illustrated in the drawings, in which:

FIG. 1 is a plan view of a brake lining machined in accordance with a first exemplary embodiment of the regeneration method in accordance with the invention, the brake lining being shown after termination of the machining;

FIG. 2A is a schematic sectional view through the brake lining shown in FIG. 1;

FIG. 2B is a schematic sectional view through the brake lining of FIG. 2A after pressing on the fresh friction lining composition;

DETAILED DESCRIPTION OF THE INVENTION

Figure 3:
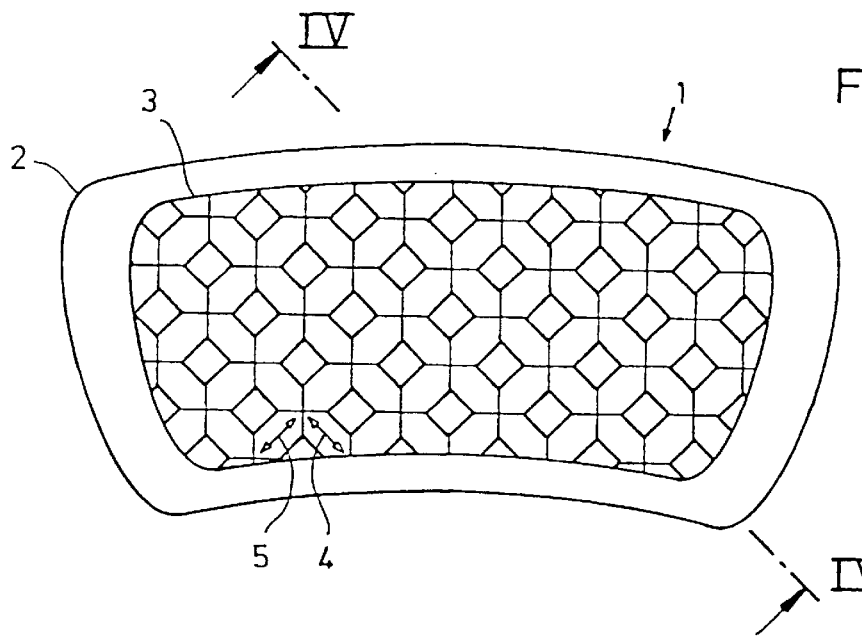
FIG. 3 is a plan view of a brake lining machined in accordance with an alternative exemplary embodiment of the method in accordance with the invention, the brake lining being shown after termination of the machining.

The brake lining shown in FIG. I has a friction lining layer 3 applied to a lining carrier 2. In order to regenerate the brake lining the friction lining layer 3 is machined from its worn surface and provided with a three-dimensional profile. The machined surface profile of the friction lining layer 3 extends in a first direction 4 in the illustrated brake lining.

FIG. 2A is a schematic sectional view of the brake lining shown in FIG. 1 along the line II. The original worn surface of the friction lining is shown by a chain-dotted line. The worn friction lining layer 3 is firmly connected to the lining carrier 2 by means of an intermediate layer 10.

In the exemplary embodiment illustrated in FIG. 2A, a three-dimensional tooth-shaped surface profile 7 is produced by means of the machining process. In alternative embodiments this profile can be saw tooth-shaped, trapezoidal or meander-shaped. The profile preferably extends transversely to the principal loading direction during the braking process. In the case of a saw tooth-shaped profile with perpendicular and oblique profile walls, the perpendicular profile walls point approximately in the direction of the force exerted by the brake lining during the braking process. This additionally increases the resistance to shearing away.

FIG. 2B is a schematic sectional view through the regenerated brake lining. After applying a layer 8 of bonding agent or adhesive to the profile surface 7 a fresh friction lining composition 9 was pressed on. The fresh friction lining composition is pressed on in a thickness which is more than half the overall thickness of the friction lining comprising the old friction lining composition 3 and the fresh friction lining composition 9.

FIG. 3 is a schematic plan view of a brake lining in which the surface of the worn friction lining layer is provided with a three-dimensional surface profile in accordance with an alternative exemplary embodiment of the method in accordance with the invention. A profile extending in a first direction 4 is firstly produced by means of machining (grinding, milling). The profile grinding or profile milling is then repeated in a second direction 5, whereby the surface structure shown in FIG. 3 is produced.

Figure 4A:
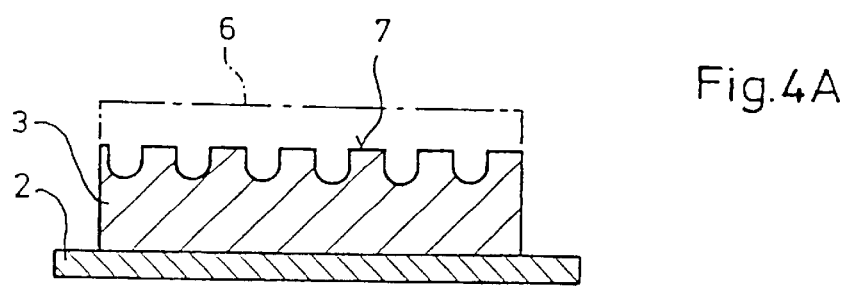
FIG. 4A is a schematic sectional view of the brake lining of FIG. 3.

FIG. 4A is a schematic sectional view of the brake lining shown in FIG. 3 along the line II. The profile shape formed in the second direction may be seen in this sectional view. The surface profile 7 of the friction lining layer 3 is produced in this case by initially plane grinding away a portion of the worn friction lining layer and then producing the illustrated recesses with partially perpendicular side walls. The preceding plane grinding eliminates the non-uniform wear (oblique wear) of the surface of the friction lining layer 3 which potentially occurred in the course of operation. The obliquely worn surface of the old friction lining layer is shown by a chain-dotted line 6. The intermediate layer disposed between the friction lining layer 3 and lining carrier 2 has not been shown in FIG. 4A.

Figure 4B:
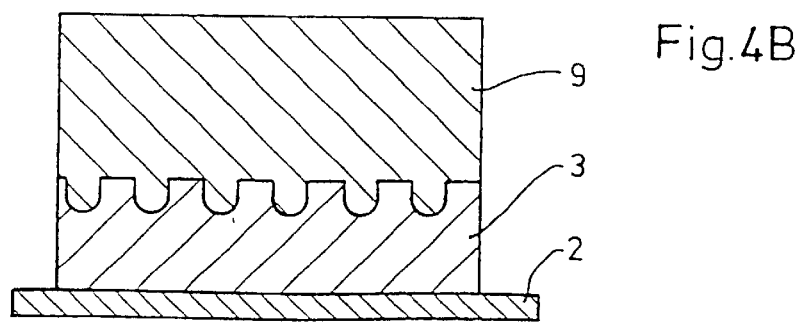
FIG. 4B is a sectional view of the brake lining in FIG. 3 after pressing on the fresh friction lining composition.

FIG. 4B is a sectional view through the brake lining after applying the fresh friction lining layer 9. The layer of bonding agent applied between the old friction lining layer 3 and fresh friction lining 9 is not shown. It is generally so thin that it is not visible in cross-section on the illustrated scale.

In alternative embodiments of the method in accordance with the invention the machining process for producing the three-dimensional surface profile can be modified so that different surface regions of the machined friction lining layer are provided with different surface profiles. The surface profiles can point in different directions in different regions or sections of the surface of the friction lining layer. The surface profile structure is selected in dependence on the shape and the material of the friction lining layer, the nature of the application of the bonding agent, the process by which the fresh friction lining composition is pressed on and the loadings during use of the brake lining.

What is claimed is:

1. A method of regenerating brake lining having a fraction lining layer, said friction lining layer having a worn surface, said method comprising the steps of:

maching said worn surface of said friction lining in such a way that a three-dimensionally profiled surface of said friction lining layer is formed; and coating said profiled surface with a bonding agent and pressing thereon a fresh friction lining composition so as to form an inner surface of said fresh friction lining composition, said inner surface having a shape complementary of said profiled surface of said friction lining layer, whereby a regenerated friction lining layer is formed.

2. The method of claim 1, wherein said machining step comprises at least one material removing step ina first direction substantially parellel to said worn surface thereby forming a first plurality of parellel grooves in the worn surface.

3. The method as claim 2, wherein said grooves are formed in a shape which is at least one of meander-shape, saw tooth-shape and trapezoidal shape.

4. The method as claim 2, wherein following said first machining step said worn surface is machined in a second direction transverse to said first direction, whereby a second plurality of parellel grrroves crossing said first plurality of grooves is formed.

5. The method as claim 1, wherein at least one maching step is selected from the group consisting of coarse grinding, profile grinding and profile milling.

6. The method as claim 2, wherein said first direction is transverse to a direction of a main loading of the friction lining layer during a braking process.

7. The method as claim 6, wherein said machining step further comprises a second material removing step in each of a plurality of portions of the worn surface wherein the direction of the second material removing step differs from said firts direction thereby forming a second plurality of grooves in each of the plurality of portions of the worn surface.

8. The method as claim 8, wherein said machining step comprises a coarse grinding in a first direction such that an irregular surface structure with substantially elongate recesses is produced, said recesses extending, at least in sections, substantially in said first direction.

9. The method of claim 8, wherein said maching step is repeated in a second direction transverse to said first direction.

10. The method as claim 8, wherein said first direction is transverse to a direction of a main loading of the friction lining layer during a braking process.

11. The method as claim 10, wherein said machining step further comprises a second material removing step in each of a plurality of portions of the worn surface wherein the direction of the second material removing step differs from said first direction thereby forming a second plurality of grooves in each of the plurality of portions of the worn surface.

12. The method as claim 1, wherein said profiled surface comprises a profile depth in a range of about 1 to 30 mm.

13. The method as claim 8, wherein said profile depth is in a range of about 5 to 20 mm.

14. The method as claim 1, wherein said friction lining layer is fastened to a metal sheet, said machining step comprising machining said friction lining layer down to a predetermined residual thickness such that said metal sheet constitutes, together with the remainder of said machined friction lining layer, a sufficiently mechanically stable structure for the caoting and pressing steps.

15. The method as claim 1, wherein said bonding agent comprises a phenol resin or a rubber.

16. The method as claim 2, wherein said first direction is at a right angle to a direction of a main loading of the friction lining layer during a braking process.

17. The method as claim 8, wherein said first direction is at a right angle to a direction of a main loading of the friction lining layer during a braking process.

* * * * *

UNITED STATES PATENT AND TRADEMARK OFFICE
CERTIFICATE OF CORRECTION

PATENT NO. : 6,623,581 B2
DATED : September 23, 2003
INVENTOR(S) : Baumesiter

It is certified that error appears in the above-identified patent and that said Letters Patent is hereby corrected as shown below:

Column 4,
Line 29, please delete "maching said worn surface of said friction lining" and insert -- matching said worn surface of said friction lining layer --.
Line 40, please delete "step ina first" and insert -- step in a first --.
Line 46, please delete "saw tooth-shape" and insert -- saw-shape --.
Line 50, please delete "parellel grroves" and insert -- parellel grooves --.
Line 52, please delete "one maching" and insert -- one matching --.

Signed and Sealed this

Twenty-eighth Day of June, 2005

JON W. DUDAS
*Director of the United States Patent and Trademark Office*